United States Patent
Sherwin et al.

(10) Patent No.: US 11,409,098 B2
(45) Date of Patent: Aug. 9, 2022

(54) MIRROR VIA CONDUCTIVITY FOR DMD PIXEL

(71) Applicant: TEXAS INSTRUMENTS INCORPORATED, Dallas, TX (US)

(72) Inventors: Lucius M. Sherwin, Plano, TX (US); Jesse Yuan, Dallas, TX (US); Noppawan Boorananut, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 280 days.

(21) Appl. No.: 15/818,973

(22) Filed: Nov. 21, 2017

(65) Prior Publication Data

US 2019/0155016 A1 May 23, 2019

(51) Int. Cl.
*G02B 26/08* (2006.01)

(52) U.S. Cl.
CPC .............. *G02B 26/0833* (2013.01)

(58) Field of Classification Search
CPC ...... G02B 26/0833; G02B 26/08; G02B 5/08; G02B 26/0841; G02B 26/0825
See application file for complete search history.

(56) References Cited

U.S. PATENT DOCUMENTS

| 8,501,023 B2 | 8/2013 | Mangrum | |
| 2004/0156089 A1* | 8/2004 | Doan | G02B 26/0833 359/291 |
| 2007/0258125 A1 | 11/2007 | Knipe | |
| 2009/0002805 A1 | 1/2009 | Yang et al. | |
| 2009/0231673 A1* | 9/2009 | Oden | G02B 26/0841 359/291 |
| 2017/0050844 A1 | 2/2017 | Ehmke et al. | |
| 2017/0176740 A1* | 6/2017 | Barron | G02B 26/0833 |

OTHER PUBLICATIONS

International Search Report for PCT/US2018/061980 dated Feb. 21, 2019.
Zapevalin, A.I. Overview of Gas-Phase Chemistry Used for Plasma Chemical Etching Si, SIO2 and SI3N4; Penza State University; printed Feb. 21, 2019; pp. 2-6.
Benjamin Lee, DMD 101: Introduction to Digital Micormirror Device (DMD) Technology. Application Report DLPA008A-Jul. 2008-Revised Oct. 2013.

* cited by examiner

*Primary Examiner* — Euncha P Cherry
(74) *Attorney, Agent, or Firm* — Michelle F. Murray; Charles A. Brill; Frank D. Cimino

(57) ABSTRACT

A method includes forming a first aluminum silicon layer on a metal layer and forming a titanium nitride layer (or other titanium-based layer) on a surface of the aluminum-silicon layer opposite the metal layer. The method further includes etching the titanium nitride layer to create a titanium nitride pad and forming a torsion hinge in the metal layer. The titanium nitride pad is on the torsion hinge. The method also includes depositing a sacrificial layer over the torsion hinge and titanium nitride pad, forming a via in the sacrificial layer from a surface of the sacrificial layer opposite the torsion hinge to the titanium nitride pad, depositing a metal mirror layer on a surface of the sacrificial layer opposite the torsion hinge and into the via, and removing the sacrificial layer.

19 Claims, 8 Drawing Sheets

MIRROR VIA CONDUCTIVITY FOR DMD PIXEL

BACKGROUND

Light processing systems often involve directing light towards a display such that an image is produced. One way of effecting such an image is through the use of digital micromirror devices (DMD). In general, light is shined on a DMD having an array of numerous micromirrors. Each micromirror is selectively controlled to reflect the light towards a particular portion of a display, such as a pixel. The angle of a micromirror can be changed to switch a pixel to an "on" or "off" state. The micromirrors can maintain their "on" or "off" state for controlled display times.

SUMMARY

In one embodiment, a method includes forming a first aluminum silicon layer on a metal layer and forming a titanium nitride layer on a surface of the aluminum-silicon layer opposite the metal layer. The method further includes etching the titanium nitride layer to create a titanium nitride pad and forming a torsion hinge in the metal layer. The titanium nitride pad is on the torsion hinge. The method also includes depositing a sacrificial layer over the torsion hinge and titanium nitride pad, forming a via in the sacrificial layer from a surface of the sacrificial layer opposite the torsion hinge to the titanium nitride pad, depositing a metal mirror layer on a surface of the sacrificial layer opposite the torsion hinge and into the via, and removing the sacrificial layer.

In yet another embodiment, a method includes forming a titanium nitride layer on a metal layer, forming a first aluminum silicon layer on a surface of the titanium nitride layer opposite the metal layer, etching the titanium nitride layer to create a titanium nitride pad, and forming a torsion hinge in the metal layer. The titanium nitride pad is on the torsion hinge. The method also includes depositing a sacrificial layer over the torsion hinge and titanium nitride pad, forming a via in the sacrificial layer from a surface of the sacrificial layer opposite the torsion hinge to the titanium nitride pad, depositing a metal mirror layer on a surface of the sacrificial layer opposite the torsion hinge and into the via; and removing the sacrificial layer.

An apparatus also is disclosed that includes a semiconductor substrate, a torsion hinge formed on the semiconductor substrate, and a titanium nitride pad formed on the torsion hinge. The apparatus also includes a mirror layer including a via formed on the titanium nitride pad and rotatable by the torsion hinge. The apparatus may comprise a DMD.

BRIEF DESCRIPTION OF THE DRAWINGS

For a detailed description of various examples, reference will now be made to the accompanying drawings in which.

DETAILED DESCRIPTION

A digital micromirror device (DMD) includes an array of mirrors (also termed micromirrors herein) with each mirror mechanically and electrically coupled to a corresponding torsion hinge by way of a conductive via. Each mirror can be made to rotate to one position or another (e.g., +/−1-12 degrees) through application of suitable voltages to electrodes. Once the mirror has been rotated to one position (e.g., +12 degrees), a sufficiently large voltage (the recapture margin) is required to rotate the mirror to the opposite position (e.g., −12 degrees).

The disclosed embodiments of a DMD reduces the recapture voltage that would otherwise be needed to move the mirror. In an embodiment, the via that mechanically supports the mirror over the hinge and provides electrical conductivity to the mirror is formed on the hinge with a titanium nitride (TiN) pad and aluminum silicon layer creating an ohmic path between the mirror metal and and the hinge metal. Alternative embodiments include titanium-tungsten (TiW) or titanium-aluminum nitride (TiAlN) instead of TiN. The titanium-based pad (e.g., TiN pad) prevents native oxide growth on the hinge metal and reduces the resistance of the interface between the mirror metal and the hinge metal in the via interconnect thereby permitting the mirror to be rotated with a smaller voltage.

Figure 1:
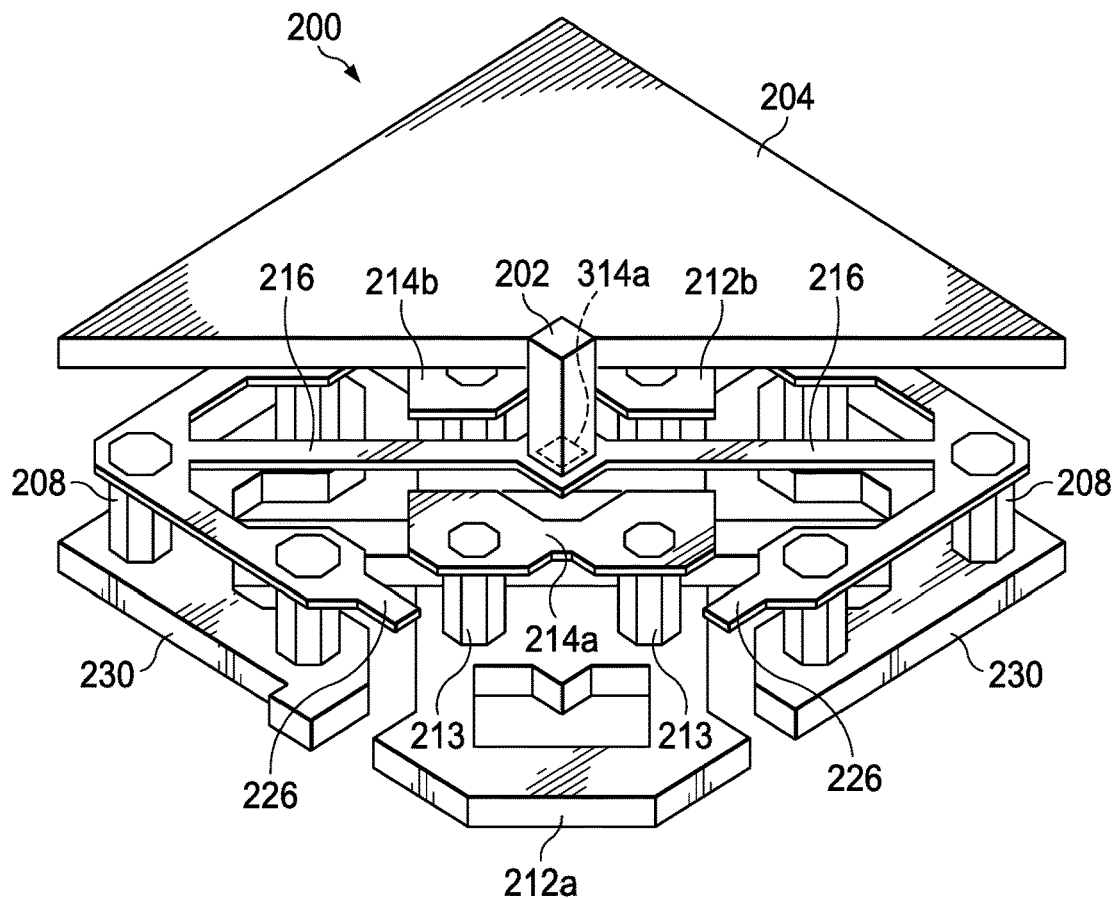
FIG. 1 illustrates a digital micromirror device (DMD) in accordance with the disclosed embodiments.

FIG. 1 illustrates a single DMD pixel element 200. An array of such pixel elements may be formed on a common semiconductor die. The DMD pixel element 200 of FIG. 1 may include a hinge portion, an address portion, and a mirror portion. The hinge portion includes a hinge 216 (which may be a torsion hinge), supported on each side by hinge posts. Six bias vias 208 support spring tips 226 (two of which are shown in FIG. 1 and two more are present but hidden in this view) and hinge 216 above the lower layer 230. The bias vias 208 may also operate to relay a bias voltage to hinge 216. A micromirror 204 is supported above the hinge 216 by a mirror via 202. A titanium nitride pad 314a is sandwiched between the via 202 and the hinge 216 to thereby reduce the resistance of the mirror via 202. In addition to providing support for the micromirror 204, the mirror via 202 may conductively transfer the bias voltage to the micromirror 204. The bias voltage may then be conductively transferred to the spring tips 226 and hinge 216 through the six bias vias 208. The bias voltage may be then further transferred from the hinge 216 to the micromirror 204 through the mirror via 202.

The address portion of the DMD pixel element 200 includes two address pads 212a, 212b (collectively address pads 212) that each connect to raised address electrodes 214a, 214b, respectively. As illustrated in FIG. 1, address vias 213 support the raised address electrodes 214a, 214b above each address pad 212a, 212b. In addition to supporting the raised address electrodes 214a, 214b, the address vias 213 relay a control or address voltage from the address pads 212a, 212b to the raised address electrodes 214a, 214b. The address pads 212a, 212b may be in communication with a control circuitry, such as a static random access memory (SRAM) cell or the like, which selectively applies a control or address voltage to one of the two address pads 212a, 212b to create an electrostatic force between the micromirror 204 and the raised address electrodes 214a, 214b. A similar electrostatic force may be created between the micromirror 204 and the address pads 212a, 212b.

The range of motion of the micromirror 204 may be limited by spring tips 226. During operation of DMD pixel element 200, spring tips 226 provide a landing point for micromirror 204. For example, when micromirror 204 is tilted in the direction of the raised address electrode 214a and address pad 212a, the spring tips 226 positioned proximate these address elements will operate as a landing point for micromirror 204. Conversely, when micromirror 204 is tilted in the direction of the raised address electrode 214b and address pad 212b, the spring tips 226 on the opposite side (and hidden in the view of FIG. 1) positioned proximate these address elements may operate as a landing point for micromirror 204. Thus, micromirror 204 may be tilted in the positive or negative direction until the micromirror 204 contacts one or more spring tips 226.

As noted above, a titanium nitride pad is included between the mirror via 202 and the hinge 216. In some embodiments, each DMD pixel element including the titanium nitride pad is formed by way of one or more semiconductor process operations, examples of which are provided below.

Figure 2:
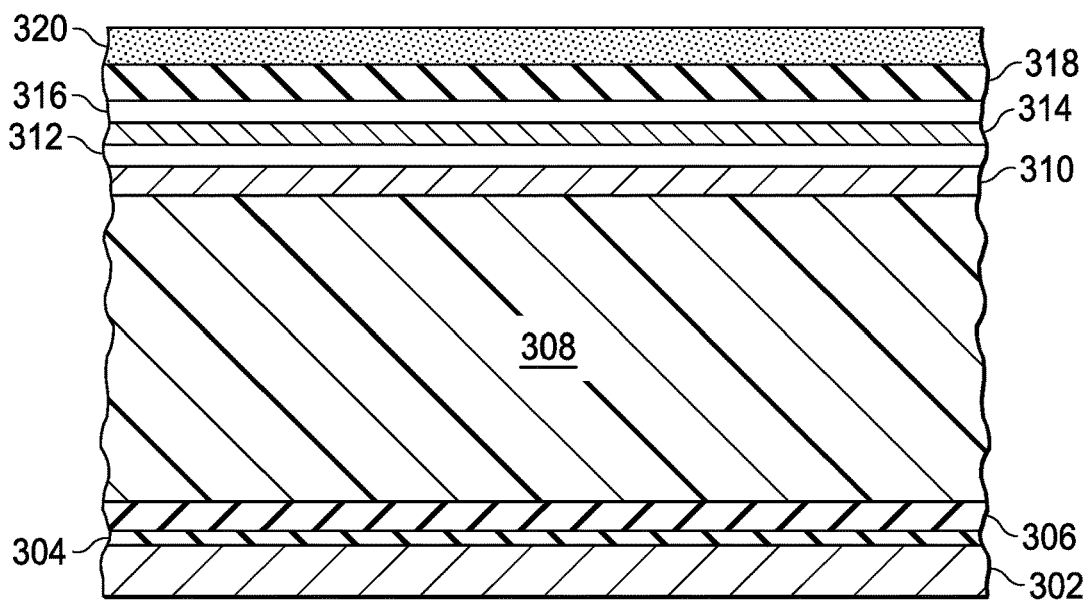
FIG. 2 illustrates an initial material stack to form the DMD in accordance with the disclosed embodiments.

FIGS. 2-13 illustrate the DMD pixel element at various stages of formation. The processing operations include fabricating a titanium nitride pad at the interface between the mirror via and the hinge. FIG. 2 illustrates a stack of materials. In this example, the stack includes a titanium nitride layer 302, a silicon nitride layer 304, an aluminum oxide ($Al_2O_3$) layer 306, a sacrificial layer 308, a metal layer 310, an aluminum silicon layer 312, a titanium nitride layer 314 (which ultimately is used to implement the titanium nitride pad), another aluminum silicon layer 316, an oxide layer 318, and a bottom antireflective coating (BARC) 320. The various layers can be deposited one on top of the other using any of a variety process operations. The sacrificial layer 308 may comprise a photoresist. The metal layer 310, aluminum silicon layer 312, titanium nitride layer 314, and aluminum silicon layer 316 may be sputtered in the same tool in three different process chambers under vacuum so that no native oxide is grown between the layers. The deposition of layer 316 in-situ is optional and can be performed in another tool after an air break. Native oxide is not a problem for the interface between the titanium nitride layer 314 and the upper aluminum silicon layer 316.

The metal layer 310 eventually is etched to form the hinge and the titanium nitride layer 314 is processed to form a titanium nitride pad on the hinge. Aluminum silicon layers 312 and 316 are provided on either side of the titanium nitride layer 314 for different reasons. The bottom aluminum silicon layer 312 protects the metal layer 310 during the etching process of the titanium nitride layer 314 to form the titanium nitride pad. The lower aluminum silicon layer 312 functions as an etch stop layer to protect the metal layer 310. The subsequent wet chemical etch with developer exposes the metal layer 310 with nearly no change in thickness, thereby not interfering with the characteristics of the hinge 216. The upper aluminum silicon layer 316 functions to provide an etch stop layer for the oxide etch process. This prevents the formation of an undesirable hard to etch titanium fluoride layer. After a wet chemical etch with developer, the next pattern and etching steps produce a smooth surface of the titanium nitride pad and hinge 216.

The thicknesses of the aluminum silicon layers 312 and 316 and the titanium nitride layer 314 can vary from embodiment to embodiment. In some embodiments, the thickness of the lower aluminum silicon layer 312 is approximately 200 Å, the thickness of the upper aluminum silicon layer 316 is approximately 100 Å, and the thickness of the titanium nitride layer 314 is approximately 50 Å. The metal layer 310 may be approximately 350 Å thick in some embodiments.

Figure 3:
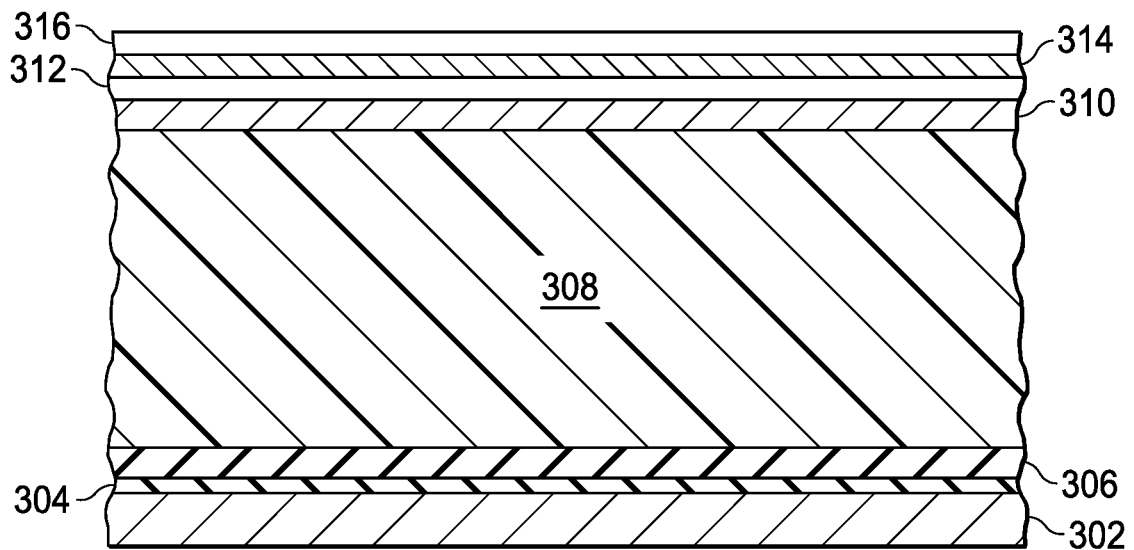
FIG. 3 illustrates an intermediate step in which a bottom reflective coating (BARC) and an oxide layer have been removed in accordance with the disclosed embodiments.

The BARC 320 is dry etched from the flat surfaces of the wafer but BARC is left in the via(s) since the BARC coat process causes BARC to be thicker in the via(s). The oxide layer 318 is dry etched from the flat surfaces of the wafer but the BARC that is left in the via(s) protects the oxide and the other layers in the via, the upper aluminum silicon layer 316, titanium nitride layer 314, lower aluminum silicon layer 312, and metal layer 310. The dry oxide etch process stops on the upper aluminum silicon layer 316 on the flat surfaces. This protects the titanium nitride layer 314. The resulting stack is shown in FIG. 3.

Figure 4:
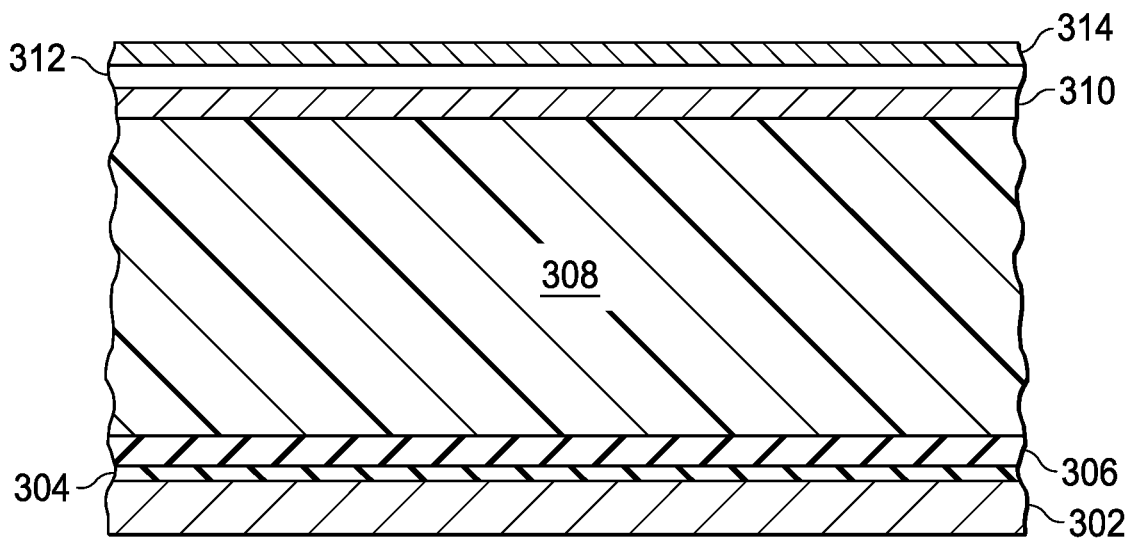
FIG. 4 illustrates a further intermediate step in which an aluminum silicon layer has been removed in accordance with the disclosed embodiments.
Figure 5:
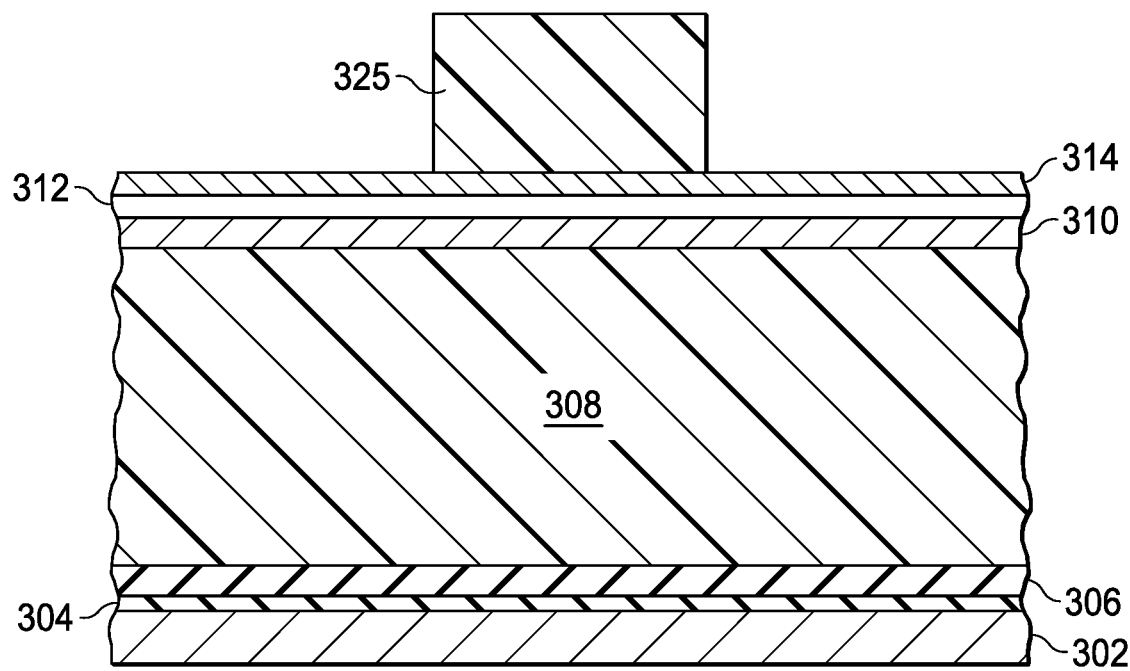
FIG. 5 illustrates a further intermediate step in which a pillar pattern is placed on the titanium nitride layer in accordance with the disclosed embodiments.

The upper aluminum silicon layer 316 is then removed on the flat surfaces but not in the via (s) with, for example, a developer such as NMD-W TMAOH in water. The resulting stack is shown in FIG. 4. At this point, the top-most layer in the stack is the titanium nitride layer 314. The next operation is to pattern the titanium nitride pad out of the titanium nitride layer. FIG. 5 illustrates that a pillar pattern 325 is placed on the titanium nitride layer 314 at the desired location of the titanium nitride pad. The location, as will be seen in FIG. 9, coincides with a portion of the hinge 216 at which the mirror via 202 is to be performed. The cross-sectional shape and size of the pillar pattern 325 matches the desired shape and size of the titanium nitride pad. With the pillar pattern 325 in place, a process operation is performed to remove titanium nitride everywhere except for the location of the pillar pattern and in the via(s). Titanium nitride may be removed by, for example, a chlorine and boron trichloride RIE plasma etch. The etching process etches through the titanium nitride layer 314 and at least some of the bottom aluminum silicon layer 312. The aluminum silicon layer 312 ensures that the underlying metal layer 310 is not disturbed, or that at least an insufficient amount of material from the metal layer 310 is removed to cause any performance issues with the hinge. The pillar pattern 325 is stripped. Then, using a developer such as NMD-W TMAOH in water, the pillar pattern 325 is stripped and the remaining lower aluminum silicon layer 312 is removed on the flat surfaces but not from under the titanium nitride pad and not from the via (s).

Figure 6:
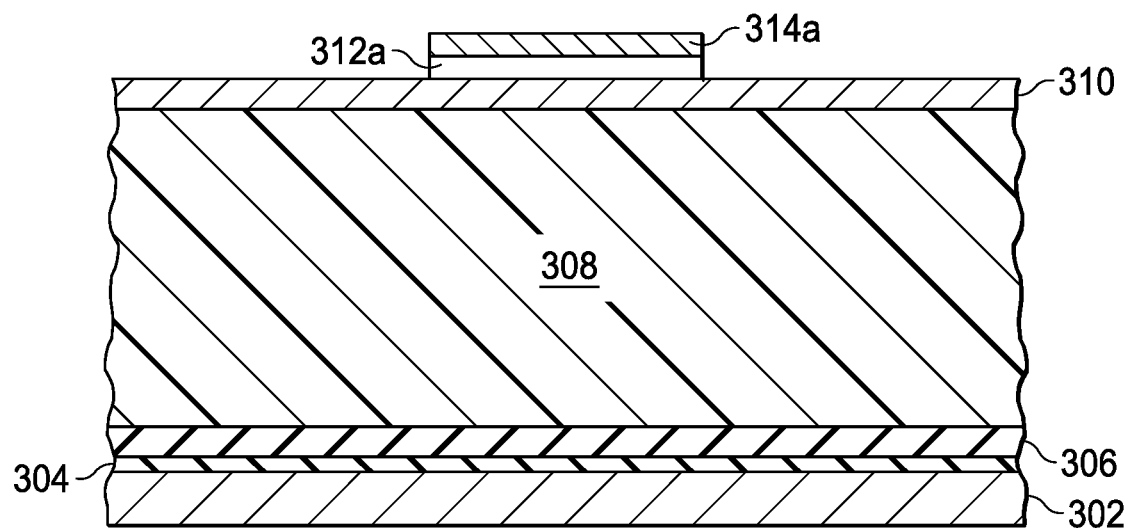
FIG. 6 illustrates yet a further intermediate step in which the titanium nitride layer has been etched to form a titanium nitride pad in accordance with the disclosed embodiments.
Figure 7:
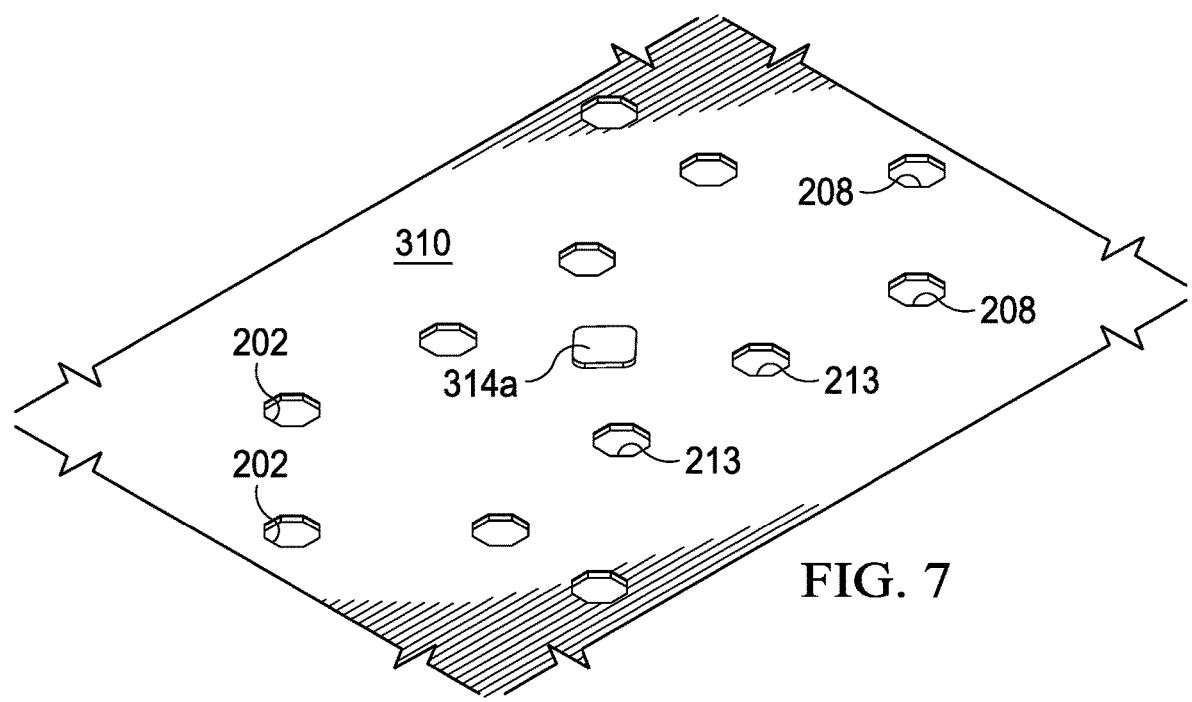
FIG. 7 shows an upper surface of a metal layer containing the titanium nitride pad in accordance with the disclosed embodiments.
Figure 8:
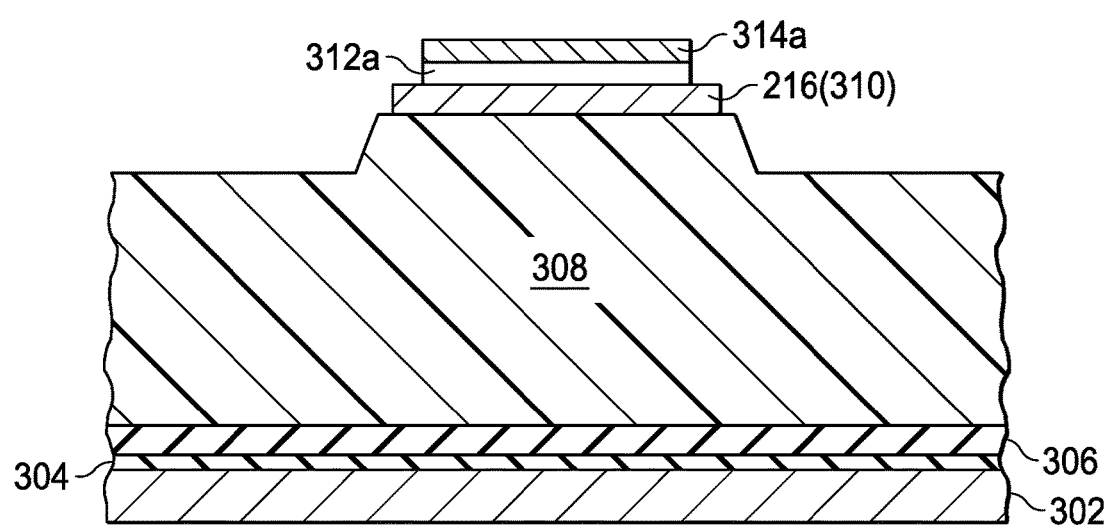
FIG. 8 illustrates a further step in which the metal layer has been etched to form a hinge in accordance with the disclosed embodiments.
Figure 9:
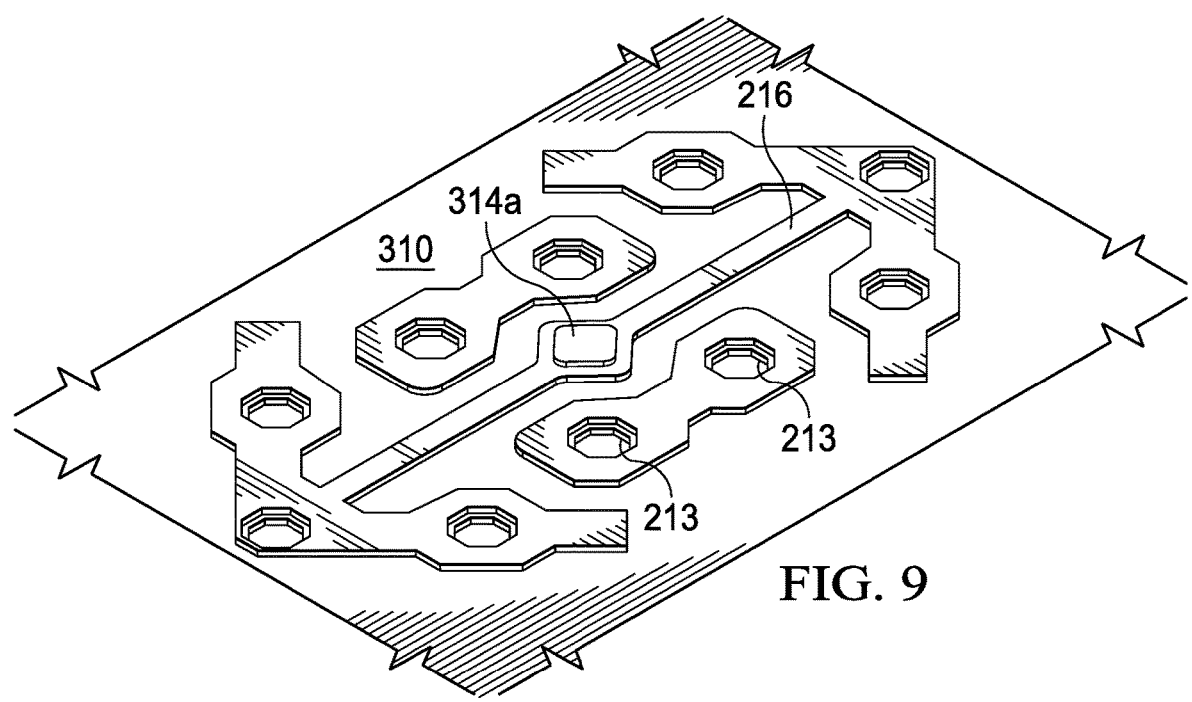
FIG. 9 shows a portion of the surface of the metal layer with the hinge formed thereon and the titanium nitride pad formed on the hinge in accordance with the disclosed embodiments.

FIG. 6 illustrates the resulting stack with the titanium nitride pad depicted as titanium nitride pad 314a and lower aluminum silicon layer depicted as lower aluminum silicon pad 312a. FIG. 7 shows a portion of the surface of the metal layer 310. The titanium nitride pad 314a is shown as are a number of vias, such as address vias 213 and bias vias 208. The metal layer 310 is then processed to form the torsion hinge 216 thereon. FIG. 8 shows an example in which a mask (not shown) is placed on the metal layer 310 and those portions of the metal layer 310 not covered by the mask are then etched to thereby create the torsion hinge 216. In some embodiments, the etching process to form the hinge 216 may comprise a chlorine and boron trichloride RIE plasma etch. FIG. 9 shows a portion of the metal layer with a portion of the hinge 216 formed thereon. As can be seen the titanium nitride pad 314a is located at the center of the hinge where the mirror via is to be formed.

Figure 10:
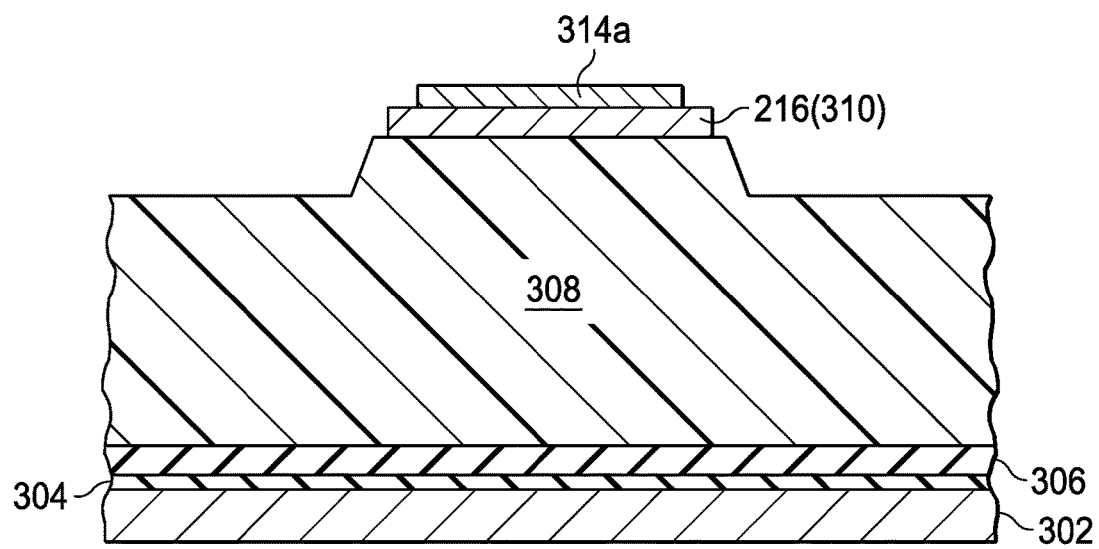
FIG. 10 shows an alternative embodiment of a material stack for forming the DMD in accordance with the disclosed embodiments.

FIG. 10 illustrates an alternative embodiment of the materials stack to form the hinge 216 and titanium nitride pad 314a. This example does not include the lower aluminum silicon layer that was otherwise present (aluminum silicon layer 312) in FIGS. 2-9. In the example of FIG. 10, a different type of etching process may be used to etch the titanium nitride layer 314 without removing any or much of the metal layer 310. In one example, the etching process may comprise fluoroform and chlorine in a dry etching process such as a plasma reactive-ion etching (RIE) process, although other types of etching processes may be used as well Some of the underlying metal layer 310 may be removed as part of this etching process (e.g., less than approximately 10% of the thickness of the metal layer 310) but removal of a relatively small amount of the metal layer does not result in a performance degradation of the resulting hinge. In some embodiments, the metal layer 310 may be initially deposited to a thicker level than may be needed for the hinge so that some of the metal can be removed when etching the titanium nitride pad. The layers depicted in FIG. 10 may be sputtered in the same tool in two different process chambers connected under vacuum so that no native oxide grows between the metal layer 310 and the titanium nitride layer 314.

Figure 11:
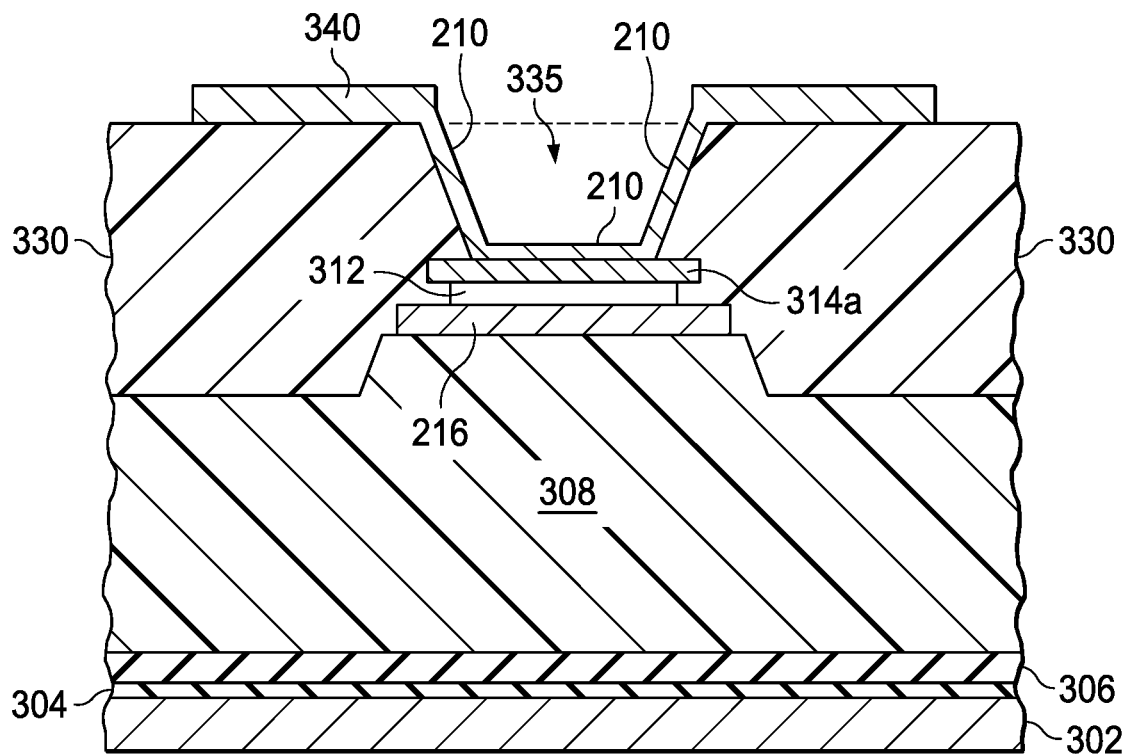
FIG. 11 shows an example of a via formed in a sacrificial layer and a mirror metal layer formed on the sacrificial layer and into the via in accordance with the disclosed embodiments.
Figure 12:
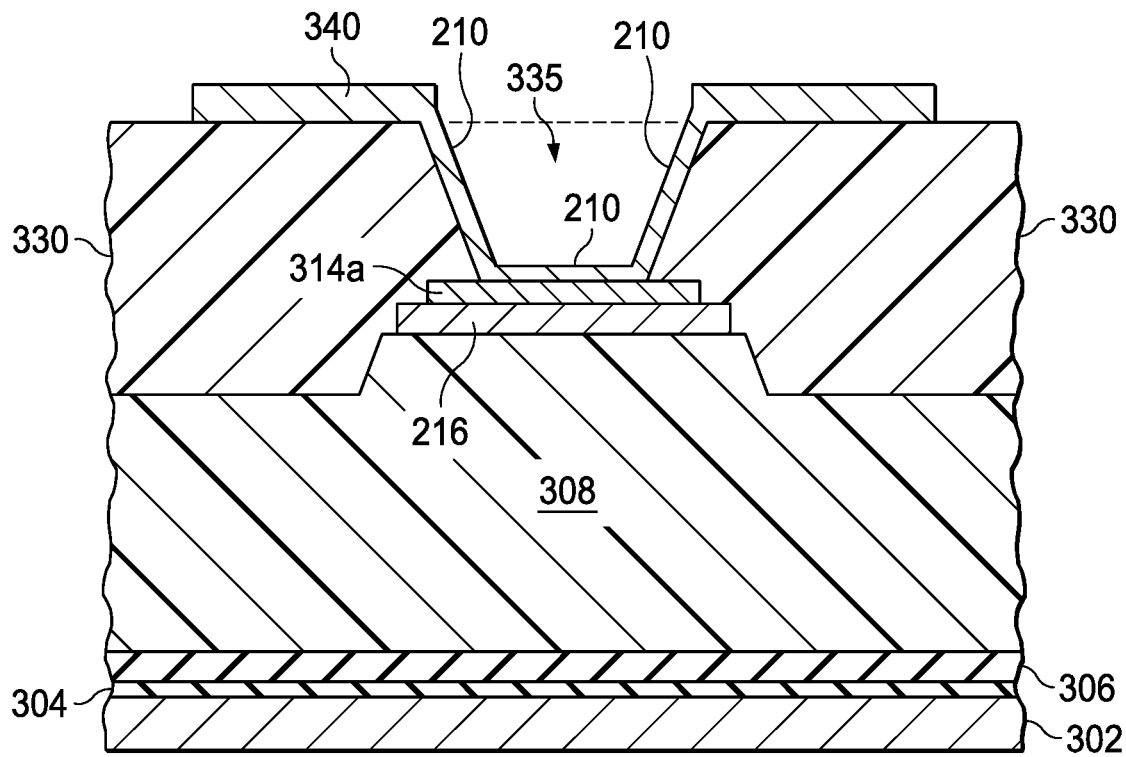
FIG. 12 shows an alternative of the structure of FIG. 11.

Once the hinge 216 is formed, an upper sacrificial layer 330 which may comprise a photoresist is formed. FIG. 11 illustrates the deposition of the upper sacrificial layer 330 on sacrificial layer 308 (also termed "lower" sacrificial layer). The upper sacrificial layer 330 also covers the titanium nitride pad 314a. A photolithography process exposes a via(s) 335 over the titanium nitride pad 314a where a low resistance interconnect to the metal mirror layer 340 is to be formed. The mirror metal 340 (e.g., a reflective aluminum alloy) also deposited on the via walls and via bottom, as is shown in FIG. 11. Once deposited, the mirror metal is further processed in a photolithography pattern and plasma RIE etch and cleanup to separate each pixel's mirror from adjacent pixels. In a subsequent packaging process, the lower and upper sacrificial layers 308 and 330 are selectively removed through the gaps around each pixel. The metal that formed in the via 335 remains thereby forming the mirror via 202 shown in FIG. 1. The mirror via 202 resides on the titanium nitride pad 314a which is on the lower aluminum silicon layer 312 which is on the hinge 216. FIG. 12 illustrates the embodiment in which the lower aluminum silicon layer 312 is absent as noted with respect to FIG. 10.

Figure 13:
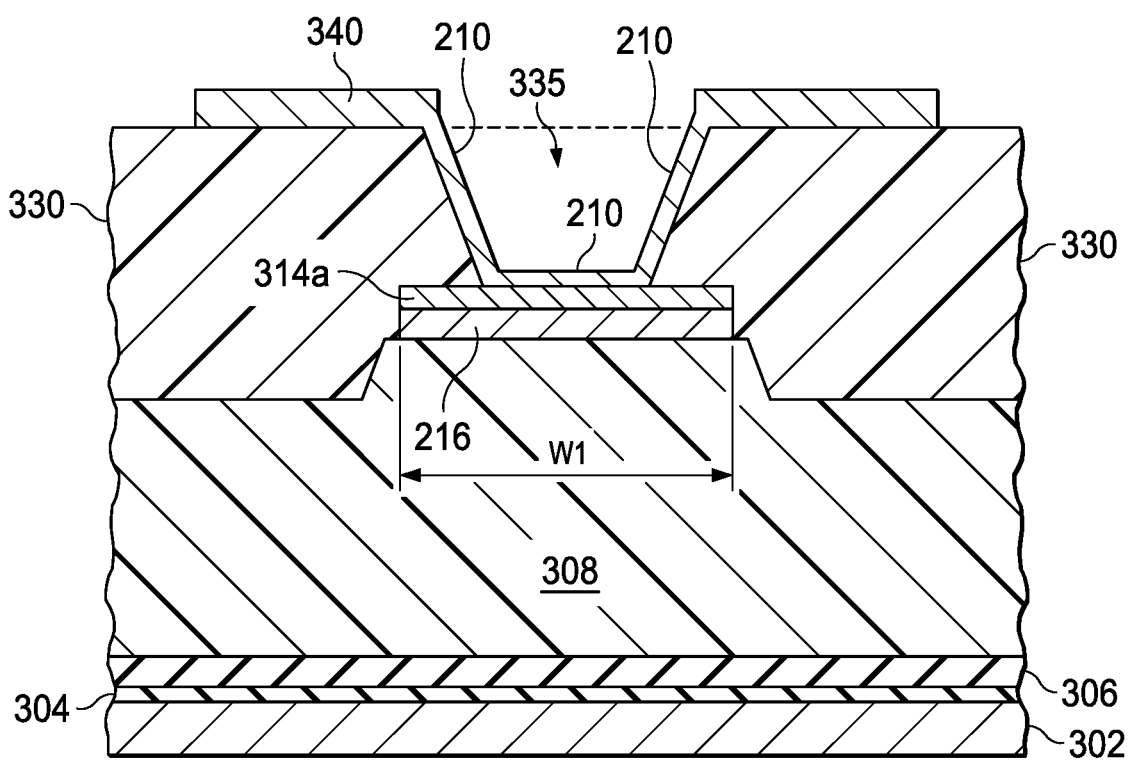
FIG. 13 shows an embodiment in which the titanium nitride pad is formed to self-align to the hinge in accordance with the disclosed embodiments.

FIG. 13 illustrates the titanium nitride pad 314a formed in a process that self-aligns the titanium nitride pad to the underlying hinge 216. In this embodiment, the titanium nitride pad is initially oversized (e.g., sized to have a footprint larger than the desired size of the final pad). That is, during the etching process to form the titanium nitride pad 314a, the pad is formed larger than the area of the mirror via to be formed thereon. The excess titanium nitride of the initially oversized titanium nitride pad is removed during the subsequent process operation to form the torsion hinge 216. As a result, the width W1 of the hinge 216 and the titanium nitride pad 314a is the same and the titanium nitride pad is centered on the hinge.

Figure 14:
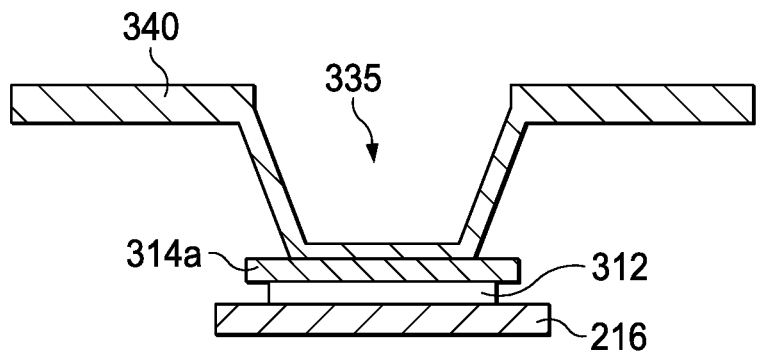
FIG. 14 shows the example of FIG. 11 following the removal of the sacrificial layers.
Figure 15:
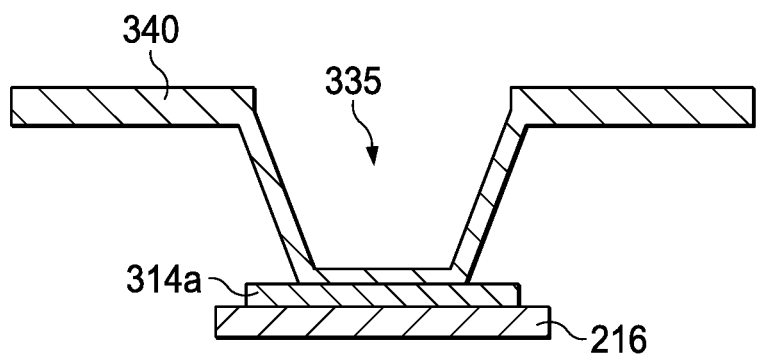
FIG. 15 shows the example of FIG. 12 following the removal of the sacrificial layers.
Figure 16:
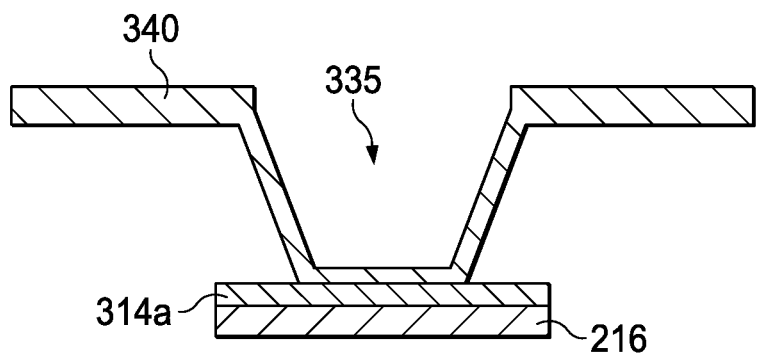
FIG. 16 shows the example of FIG. 13 following the removal of the sacrificial layers.

FIGS. 14-16 illustrate the examples of FIGS. 11-13, respectively, after the removal of the sacrificial layers 308 and 330.

In this description, the terms "couple" and "couples" mean either an indirect or direct connection. Thus, if a first structure couples to a second structure, that connection may be through a direct connection or through an indirect connection via other structures and connections. Further, in this description, the term "approximately" means plus or minus 10% in some embodiments.

Modifications are possible in the described embodiments, and other embodiments are possible, within the scope of the claims.

What is claimed is:

1. An apparatus, comprising:
    a semiconductor substrate;
    a hinge having a first side and a second side opposite the first side, the first side facing the semiconductor substrate;
    an etch stop layer on the second side of the hinge;
    a titanium-based pad on the etch stop layer;
    a mirror; and
    a mirror via coupling the mirror and the titanium-based pad.

2. The apparatus of claim 1, wherein the hinge comprises metal and the mirror comprises metal.

3. The apparatus of claim 1, further comprising an aluminum silicon layer between the titanium-based pad and the hinge.

4. The apparatus of claim 3, wherein the aluminum silicon layer is approximately 200 Å thick.

5. The apparatus of claim 1, wherein the titanium-based pad has a thickness of approximately 50 Å.

6. The apparatus of claim 1, wherein the titanium-based pad comprises titanium nitride.

7. The apparatus of claim 1, wherein the apparatus is a digital micromirror device (DMD).

8. The apparatus of claim 1, wherein the hinge is a torsion hinge.

9. The apparatus of claim 1, wherein the hinge is configured to rotate the mirror.

10. The apparatus of claim 1, wherein the titanium-based pad comprises titanium-tungsten or titanium-aluminum nitride.

11. A device comprising:
    a semiconductor substrate;
    a hinge having a first side and a second side, the first side of the hinge facing the semiconductor substrate;
    bias vias coupled to the hinge;
    an etch stop layer on the second side of the hinge;
    a titanium-based pad on the etch stop layer;

a mirror; and a mirror via coupling the mirror and the titanium-based pad.

12. The device of claim 11, wherein the hinge comprises metal and the mirror comprises metal.

13. The device of claim 11, wherein the titanium-based pad comprises titanium nitride.

14. The device of claim 11, wherein the titanium-based pad comprises titanium-tungsten or titanium-aluminum nitride.

15. The apparatus of claim 1, wherein the etch stop layer comprises aluminum silicon.

16. The apparatus of claim 1, wherein the titanium-based pad is shaped on the hinge before the hinge is shaped.

17. The device of claim 11, wherein the etch stop layer comprises aluminum silicon.

18. The device of claim 11, wherein the titanium-based pad is shaped on the hinge before the hinge is shaped.

19. The device of claim 11, wherein the etch stop layer, the titanium-base pad, and the mirror via are configured to conduct a bias voltage received through the bias vias to the mirror.

\* \* \* \* \*